Aug. 8, 1967 H. WEISS 3,335,384

ROTARY RESISTOR ARRANGEMENT EMPLOYING A GALVANOMAGNETIC SEMICONDUCTOR FIELD PLATE

Filed Sept. 10, 1965

United States Patent Office 3,335,384

Patented Aug. 8, 1967

3,335,384

ROTARY RESISTOR ARRANGEMENT EMPLOYING A GALVANOMAGNETIC SEMICONDUCTOR FIELD PLATE

Herbert Weiss, Nurnberg, Germany, assignor to Siemens-Schuckertwerke Aktiengesellschaft, Berlin, Germany, a corporation of Germany Filed Sept. 10, 1965, Ser. No. 486,383
Claims priority, application Germany, Sept. 11, 1964, S 93,102
4 Claims. (Cl. 338—68)

Figure 1:
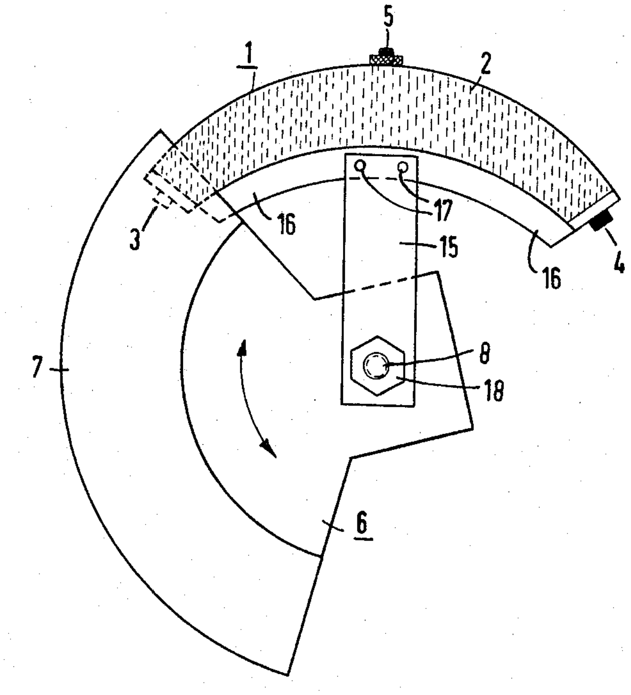

My invention relates to galvano-magnetic field plates. More particularly, it relates to such improved plates suitable for use as rotary variable resistors.

It is, at present, a known technique to movably dispose galvano-magnetic semiconductor devices in the air gap between the pole shoes of magnets such as permanent magnets to provide contact-free variable resistors or potentiometers. The value of the electrical resistance of such a galvano-magnetic semiconductor resistor attains a maximum when it is entirely contained in the magnetic field of the magnet and may be reduced to a minimum in a smooth, continuous manner, for example, by correspondingly smoothly and progressively removing the resistor from the air gap.

Because galvano-magnetic resistors lend themselves to such simple manipulation, magnets and galvano-magnetic semiconductor field plates may be advantageously arranged so as to be rotatable about a common axis of rotation. In order to achieve the requirement of the least possible space occupied by such rotary arrangements, i.e., rotary resistors and potentiometers and their associated magnetic circuits, and to enable the utilization of the maximum amount of magnetic field which is possible, it is efficacious to construct the galvano-magnetic semiconductor field plates and the pole shoes of the magnets in the rotary arrangements in arcuate configurations such as in the form of planar circular segments respectively which fit into each other and which are mutually rotatable about a common geometric axis of rotation.

Galvano-magnetic semiconductor field plates containing parallel disposed spaced anisotropies have been proposed for use as variable resistors and potentiometers. By anisotropies are meant bodies which comprise a material different from that of the homogeneous material constituting the semiconductor in the galvano-magnetic semiconductor device and which introduce anisotropic behavior into the semiconductor material. These anisotropies have good electrical conductivity as compared to the conductivity of the semiconductor material and may suitably be configured in the form of parallel aligned, spaced, short-circuit strips which are applied onto or incorporated into the semiconductor material. Alternatively, the anisotropies may suitably have the configuration of needles which are in parallel spaced relationship in or on the semiconductor material.

Such inhomogeneous anisotropies containing galvano-magnetic semiconductor devices have a much stronger galvano-magnetic dependence than do the like devices in which the semiconductor material is entirely homogeneous. The resistance change of an inhomogeneous semiconductor device in response to change in magnetic field intensity is greatest when the respective directions of the dispositions of the anisotropies, the applied magnetic field, and the current flowing through the device are all perpendicular to each other. However, such mutual perpendicularity of these three directions is not achieved in a rotary resistor arrangement with the use of an arcuately configured galvano-magnetic semiconductor field plate containing parallel disposed anisotropies therein. Such failure of achievement results from the fact that the direction of current flow cannot be made to be perpendicular to the dispositions of the parallel aligned spaced anisotropies throughout the whole plate without the forming the plate in a particular configuration. Consequently, the resistance change in the plate is varied according to location, and its resistance characteristic, when in combination with a magnet in a rotary resistor arrangement, does not vary linearly with the variation of the angle of rotation. Because of this deficiency, heretofore, it has been difficult to make practicably usable rotary resistors and potentiometers using the high galvano-magnetic anisotropic semiconductor material.

Accordingly, it is an important object of this invention to provide a galvano-magnetic semiconductor field plate suitable for use in a rotary resistor or potentiometer arrangement wherein resistance varies substantially linearly with variation in angle of rotation.

A problem solved in accordance with the invention in order to produce a substantially linear relationship between the variation in resistance in response to a corresponding variation in angle of rotation, is to change the base resistance, i.e., the resistance at zero magnetic field, whereby the degree of increase of resistance value is substantially constant at the lower levels of galvano-magnetic resistance variations.

The foregoing object is achieved by providing a galvano-magnetic semiconductor field device suitable for use in combination with a magnet to provide a rotary resistor arrangement. The device comprises a planar sickle-shape galvano-magnetic semiconductor field plate which is provided with electrical contacts at least at its respective ends. The semiconductor material in the device contains therein parallel aligned spaced anisotropies which are disposed in parallel to the surface of the plate and perpendicularly disposed in relation to the direction of substantially the bulk of the current flow, the anisotropies being of a material which is characterized by relatively good electrical conductivity as compared to the conductivity of the semiconductor material. In accordance with the invention, in the rotary resistor arrangement, the magnet thereof comprises pole shoes having substantially circular segment configuration. With such configuration, the magnet and the galvano-magnetic semiconductor field plate in the rotary resistor combination may be arranged to be rotatable relative to each other, and the rotary relationship therebetween can be so selected whereby the absolute resistance of the field plate is linearly dependent upon the angle of rotation.

In describing the sickle-shaped galvano-magnetic field plate, it is convenient to consider its shape as being that of a lunar crescent. Within such consideration, it is understood that the planar surface of the field plate is bordered by two arcuate lines whose midpoints lie on the same side of the field plate. The electrical contacts may be located at the respective ends, i.e., the tips of the sickle. The main direction of current flow is then defined by an arcuate line which runs between the above-mentioned arcuate line borders of the field plate.

In the rotary resistor arrangement according to the invention, the sickle-shaped field plate is arranged to be rotatable about an axis which lies perpendicular to the surface of the field plate and which is common to the geometric configuration of the sickle-shaped field plate and the arcuate segment shaped pole shoes. With such arrangement, the absolute change in resistance of the field plate when it is rotated in the air gap in a magnetic field perpendicular to its surface depends linearly upon the angle of rotation.

In the event that it is desired to provide a plate having the greatest possible resistance value and a large galvano-magnetic resistance variations, the semiconductor material of the field plate may be constituted of two or more series-connected sickle-shaped segments which are disposed on a carrier base plate and which may have the configuration of physically connected reciprocally occurring U-shaped sections.

Generally speaking and in accordance with the invention, there is provided a rotary resistor arrangement comprising planar sickle-shaped galvano-magnetic semiconductor field plate means with electrical contacts on the respective ends thereof, the plate means comprising a semiconductor material. Parallel spaced anisotropies are included in the semiconductor material, the anisotropies comprising a material having good electrical conductivity relative to the conductivity of the semiconductor material. The anisotropies are so disposed whereby the current path between the electrical contacts essentially taken by current supplied to the plate means is substantially perpendicular to the anisotropies. There is further provided a magnet having arcuate segment-shaped pole shoes defining an air gap therebetween for receiving the plate means therein, the plate means and the magnet being disposed to be rotatable about a common geometric axis of rotation and mutually rotatable with respect to each other whereby the resistance of the plate means varies substantially linearly with the angle of rotation.

Figure 2:
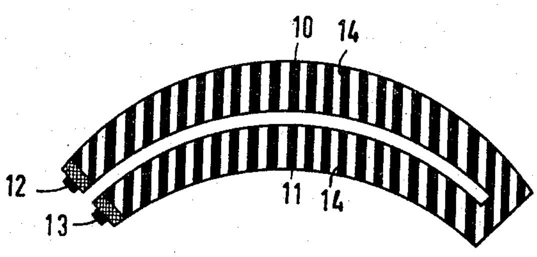
Figure 3:
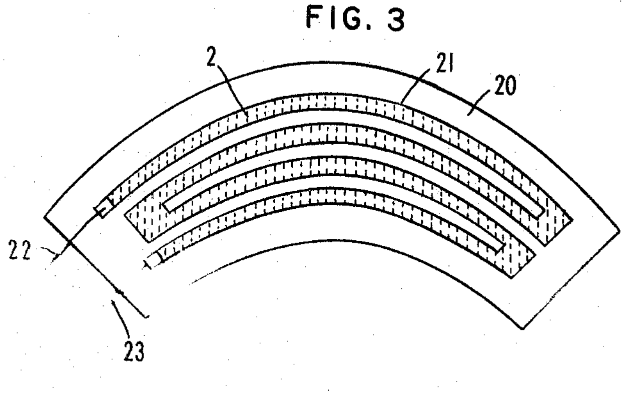

The foregoing and more specific objects and features of my invention will be apparent from and will be mentioned in the following description of a rotary resistor arrangement employing a galvano-magnetic semiconductor field plate according to the invention taken together with the accompanying drawing in which FIG. 1 is a schematic depiction of an illustrative embodiment of a rotary resistor arrangement constructed in accordance with the principles of the invention, and FIGS. 2 and 3 show other embodiments of a galvano-magnetic semiconductor field plate according to the invention and suitable for use in the arrangement of FIG. 1.

FIG. 1 is an illustrative embodiment of a rotary resistor arrangement constructed in accordance with the principles of the invention. In FIG. 1, a sickle-shaped galvano-magnetic semiconductor field plate 1 has embedded in its semiconductor material spaced parallel aligned needle-shaped anisotropies 2. The anisotropies 2 comprise a material which has good electrical conductivity as compared to the conductivity of the semiconductor material. Electrical contacts 3 and 4 are provided at the respective ends of the field plate 1. If it is desired to use the device of FIG. 1, as a rotary potentiometer, then an additional electrical terminal 5, such as a center tap, may be included on plate 1, as is shown. Terminal 5 may also suitably be located within plate 1. Structure 6 schematically depicts a magnet, which in the simplest arrangement, may be of the permanent magnet type. Included in magnet 6 are circular segment-shaped pole shoes 7 which are shown in coincident position in FIG. 1. Field plate 1 and magnet 6 are adapted to be rotatable relative to each other by suitable means (not shown) about a common axis of rotation as conceptually depicted and designated by the numeral 8. Axis 8 lies perpendicular to the plane of the surface of plate 1 whereby plate 1 may be inserted into and removed from the air gap between pole shoes 7. The magnetic field provided by magnet 6 which passes through the portion of plate 1 in the air gap is in a direction perpendicular to the disposition of the surface of field plate 1.

The local galvano-magnetic resistance variation is greatest in the center portion of field plate 1 where the semiconductor is widest (the local base resistance, i.e. resistance at zero magnetic field is small). At the narrower ends of field plate 1, the magnetic resistance variation is smaller and the semiconductor is considerably narrower (large local base resistance). By an appropriate configuring of the shape of field plate 1 in the rotary resistor arrangement of FIG. 1 in accordance with the principles of the invention, a substantially exact linearization may be achieved between the angle of rotation and the resistance of plate 1.

Plate 1 may suitably be rotatably mounted on structure 6 by a member 15 which is pivotally affixed to structure 6 at axis 8 and which is attached to a stop member 16 extending from the inner circumference of plate 1. Member 15 may suitably be affixed to stop member 16 by screws 17 and bolt 18 is used to affix member 15 to magnetic structure 6.

FIG. 2 shows another embodiment of a field plate of the present invention. In this embodiment, the field plate comprises two sickle-shaped segments 10 and 11 substantially concentrically disposed and integrally connected at one set of respective ends thereof to provide a sickle U-shaped configuration, electrical contacts 12 and 13 being provided at the unjoined ends of segments 10 and 11 respectively. It is to be realized that more substantially concentrically disposed segments may be provided. Thus, a segment could be included concentrically disposed with segment 10 and joined thereto at its end adjacent the end at which contact 12 is located to provide a plurality of reciprocally occurring U sickle-shaped sections. The anisotropies 14 in the two-segment plate of FIG. 2 may be chosen to be parallel strips of a material having a good electrical conductivity as compared to the conductivity of the semiconductor material of the plate, rather than the needle shaped inclusions 2 as shown in the embodiment of FIG. 1. However, in place of strips 14, the needle shaped inclusions 2 of FIG. 1 may, of course, be used in the embodiment shown in FIG. 2. As shown in FIG. 2, strips 14 are also arranged in parallel spaced relationship and radially disposed on the field plate. Strips 14 may suitably comprise a good conductivity material such as silver, copper, indium, etc.

FIG. 3 is an embodiment comprising a plate 20 in which the semiconductor layer 21 comprises a plurality of concentrically disposed sickle-shaped sections, adjacent pairs of these sections being formed at their ends to provide a series of reciprocally occurring sickle U-shaped sections. Layer 21 contains as anisotropic inclusions therein, radially disposed spaced needles.

The semiconductor materials which are well suited for the production of the galvano-magnetic field plates constructed according to the invention for use in a rotary resistor arrangement may be $A^{III}B^{V}$ materials formed from the elements of groups III and V of the periodic table of elements, indium antimonide and indium arsenide being particularly suited for this purpose. The directionally located inclusions in the semiconductor material may suitably consist of metals such as silver, copper, indium, etc., or a good conducting second phase of the semiconductor base material which is suitable for crystallization in needle or strip form. Examples of such base semiconductor material-second phase combinations are nickel antimonide in indium antimonide, chromium arsenide in indium arsenide, and gallium cobalt in gallium arsenide.

It will be obvious to those skilled in the art upon studying this disclosure that rotary resistor arrangements employing galvano-magnetic semiconductor field plates according to my invention permit of a great variety of modifications and hence can be given embodiments other than those particularly illustrated and described herein without departing from the essential features of my invention and within the scope of the claims annexed hereto.

I claim:

1. A rotary resistor arrangement comprising a galvano-magnetic semiconductor field plate of flat sickle-shaped configuration comprising semiconductor material having a surface of substantially planar configuration and electrical contacts on the respective ends of said field plate, parallel spaced anisotropies of good electrical conductivity relative to the conductivity of said semiconductor material, said anisotropies being positioned in the surface of said field plate parallel to the plane of said surface and substantially perpendicular to at least the principal portion of a current path between the electrical contacts of said field plate essentially taken by current supplied to said field plate, a magnet having arcuate segment-shaped pole shoes defining an air gap therebetween for receiving said field plate therein, said field plate and said magnet being arranged to be rotatable about a common geometric axis of rotation and being mutually rotatable with respect to each other with said field plate being positioned in the air gap of said magnet whereby the resistance of said field plate varies substantially linearly with the angle of rotation.

2. A rotary resistor arrangement as defined in claim 1, wherein said field plate comprises a plurality of sickle-shaped segments arranged substantially concentrically, the ends of said segments being alternately joined to provide a series of reciprocally occurring U-sickle-shaped sections.

3. A rotary resistor as defined in claim 2, wherein said anisotropies are needle-shaped.

4. A rotary resistor as defined in claim 2, wherein said anisotropies are strip-shaped.

References Cited

UNITED STATES PATENTS

| | | | |
|---|---|---|---|
| 2,778,802 | 1/1957 | Willardson et al. | 338—32 |
| 2,846,553 | 8/1958 | Black | 338—68 |
| 2,894,234 | 7/1959 | Weiss et al. | 338—32 |
| 3,112,464 | 11/1963 | Ratajski et al. | 338—32 |
| 3,162,804 | 12/1964 | Parsons | 324—54 |
| 3,267,405 | 8/1966 | Weiss et al. | 338—32 |

RICHARD M. WOOD, *Primary Examiner.*

W. D. BROOKS, *Assistant Examiner.*